United States Patent
Patureau et al.

(10) Patent No.: US 8,641,100 B2
(45) Date of Patent: Feb. 4, 2014

(54) THREADED TUBULAR CONNECTION WHICH IS LEAK-PROOF UNDER INTERNAL AND EXTERNAL SUCCESSIVE PRESSURE LOADS

(75) Inventors: Claire Patureau, Hesingue (FR); Olivier Tartar, Paris (FR)

(73) Assignees: Vallourec Mannesmann Oil & Gas France, Aulnoye-Aymeries (FR); Nippon Steel & Sumitomo Metal Corporation, Tokyo (JP)

( * ) Notice: Subject to any disclaimer, the term of this patent is extended or adjusted under 35 U.S.C. 154(b) by 350 days.

(21) Appl. No.: 12/529,933

(22) PCT Filed: Mar. 6, 2008

(86) PCT No.: PCT/EP2008/052709
§ 371 (c)(1),
(2), (4) Date: Sep. 4, 2009

(87) PCT Pub. No.: WO2008/110494
PCT Pub. Date: Sep. 18, 2008

(65) Prior Publication Data
US 2010/0102553 A1    Apr. 29, 2010

(30) Foreign Application Priority Data
Mar. 14, 2007    (FR) ..................................... 07 01837

(51) Int. Cl.
*F16L 25/00* (2006.01)
(52) U.S. Cl.
USPC ........................... 285/334; 285/333; 285/383
(58) Field of Classification Search
USPC ........................................ 285/333, 334, 383
See application file for complete search history.

(56) References Cited

U.S. PATENT DOCUMENTS

| | | | | | |
|---|---|---|---|---|---|
| 2,211,179 | A | * | 8/1940 | Stone | 285/334 |
| 4,770,444 | A | * | 9/1988 | Hauk | 285/55 |
| 5,064,224 | A | * | 11/1991 | Tai | 285/94 |

(Continued)

FOREIGN PATENT DOCUMENTS

| | | |
|---|---|---|
| DE | 44 46 806 C1 | 5/1996 |
| DE | 198 36 088 C1 | 2/2000 |
| EP | 1 030 029 | 8/2000 |
| EP | 1 631 762 B1 | 8/2010 |

OTHER PUBLICATIONS

U.S Appl. No. 13/142,493, filed Jun. 28, 2011, Patureau, et al.

*Primary Examiner* — Victor MacArthur
*Assistant Examiner* — Jay R Ripley
(74) *Attorney, Agent, or Firm* — Oblon, Spivak, McClelland, Maier & Neustadt, L.L.P.

(57) ABSTRACT

A threaded tubular connection that is leak-proof for internal and external successive pressure loads including a male element and a female element. At least one of the male or female elements includes a lip between the threading and the free end of the element. The lip includes a first zone with a peripheral surface turned towards the other element on which a first metallic sealing surface is disposed that can be radially interference fitted against a corresponding second metallic sealing surface disposed on the other element. The lip includes a second zone located axially between the first zone and the corresponding threading. The radial stiffness of the second zone is less than that of the first zone and that of a third zone adjacent to the second zone in the direction of the threading, and the second zone can be radially deformed by a pressure exerted thereon.

16 Claims, 7 Drawing Sheets

(56) References Cited

U.S. PATENT DOCUMENTS

| | | | |
|---|---|---|---|
| 5,066,052 A * | 11/1991 | Read | 285/334 |
| 6,347,814 B1 * | 2/2002 | Cerruti | 285/334 |
| 6,409,175 B1 * | 6/2002 | Evans et al. | 277/314 |
| 6,442,826 B1 | 9/2002 | Staudt et al. | |
| 6,511,102 B2 | 1/2003 | Krug et al. | |
| 6,543,816 B1 * | 4/2003 | Noel | 285/333 |
| 7,066,499 B2 * | 6/2006 | Della Pina et al. | 285/334 |
| 7,334,821 B2 | 2/2008 | Dutilleul et al. | |
| 2004/0262919 A1 * | 12/2004 | Dutilleul et al. | 285/333 |
| 2006/0157982 A1 | 7/2006 | Hignett | |
| 2006/0261595 A1 * | 11/2006 | Verger et al. | 285/334 |
| 2007/0035130 A1 * | 2/2007 | Hashem et al. | 285/333 |
| 2007/0035131 A1 * | 2/2007 | Benzie | 285/333 |

* cited by examiner

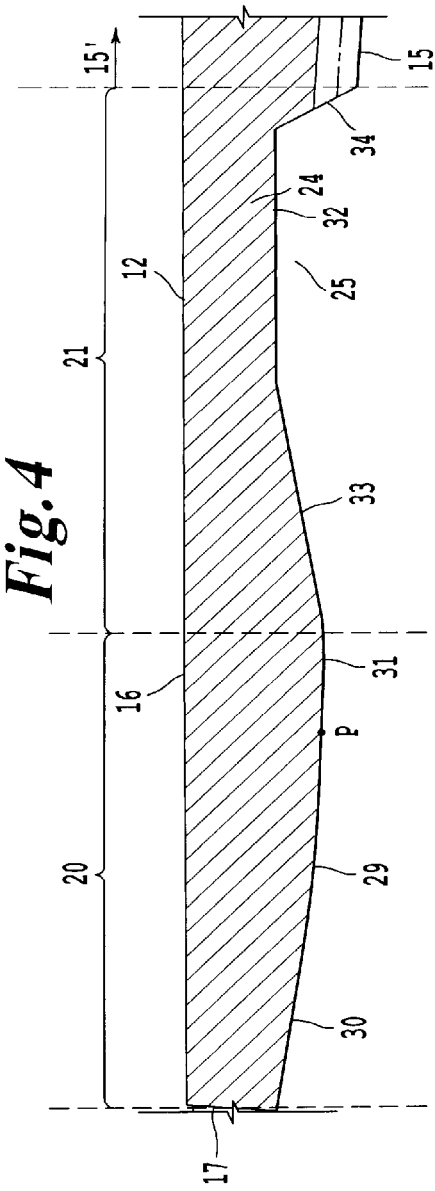

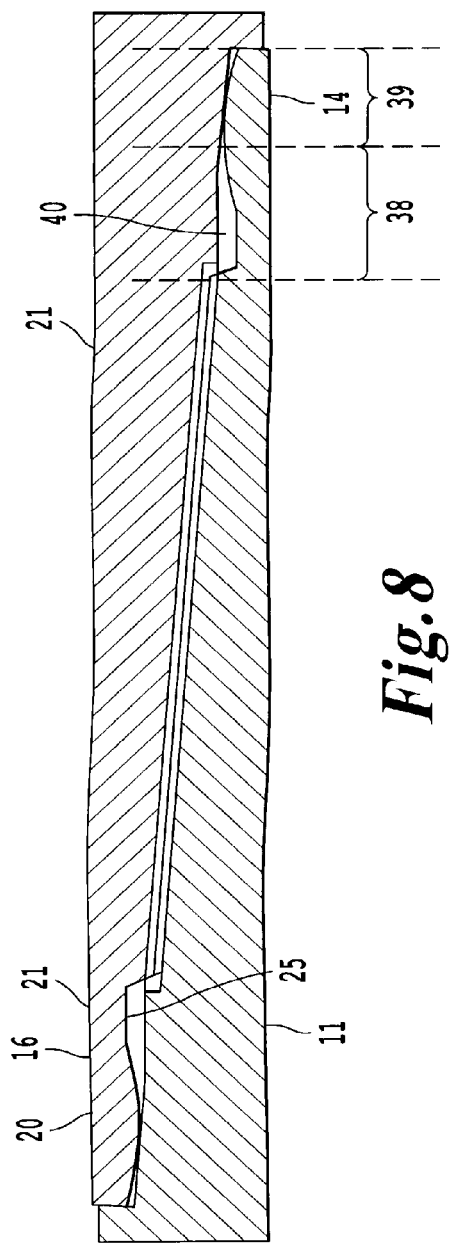

THREADED TUBULAR CONNECTION WHICH IS LEAK-PROOF UNDER INTERNAL AND EXTERNAL SUCCESSIVE PRESSURE LOADS

BACKGROUND

The present invention relates to a threaded tubular connection which is leakproof under static loads such as axial tension, axial compression, planar bending, internal or external pressure and combinations thereof.

Such leak-proof threaded tubular connections, hereinafter termed connections, may be obtained by assembling a male element at the end of a first tubular component which may, for example, be a great length tube and a female element at the end of a second tubular component which may, for example, be a great length tube or a coupling, each of said elements being provided with a metallic sealing surface and being radially interference fitted against the metallic sealing surface of the other element.

Said connections are in particular used to produce leak-proof casing strings or tubing strings for hydrocarbon wells or for similar wells such as geothermal wells.

The metallic sealing surfaces (or metal-metal sealing surfaces) of the male and female elements of such connections are extremely critical zones which produce the sealing characteristics of the connection.

In hydrocarbon wells, such connections are subjected to various loads such as tension, compression, bending along the tube axis, or pressure. Those various loads may vary with time, for example when cementing casing strings (increase of external pressure) or during production (increase in internal pressure) or also during maintenance operations (production stop then start-up) and they may act alone or in combination.

Such connections are expected not only to tolerate such mechanical loads but also to remain leak-proof when they are applied.

For this reason, the present invention seeks to improve such connections in order to increase their sealing characteristics, in particular to optimize the function of the metallic sealing surfaces.

The prior art for such connections proposes means for improving the sealing characteristics of metal-metal sealing surfaces which are subjected to a wide variety of static loads, which have in particular been described in French patent FR 2 359 353 and International patent application WO 2006/061577.

FR 2 359 353 discloses a connection which is tight to differential pressures, comprising a male element having a male threading, a female element with a complementary female threading, an outer abutment comprising a tapered annular surface located on the male element and a corresponding frontal surface located on the free end of the female element, and an outer metal-metal seal comprising a first metallic sealing surface disposed on the female element and a second metallic sealing surface disposed on the male element.

When that connection is subjected to an external differential pressure, i.e. an external overpressure, the metallic sealing surfaces are applied against each other even more strongly and the connection is thus self pressurizing. In the case of an internal differential pressure, i.e. an internal overpressure, the annular and frontal outer abutment surfaces are applied more strongly against each other.

International patent application WO 2006/061577 describes a connection provided with an outer metal-metal seal subjected to tension and compression loads. Such a threaded connection includes a female element comprising an abutment, a threading and an annular groove located between said abutment and said threading. Said annular groove, which is rectangular in shape and relatively short, enables to facilitate machining of full height threads on the female element because the thread-producing tool can be withdrawn more easily, to obtain a connection which is stronger in tension because of the longer thread length and to concentrate loads over a small zone at the groove rather than at the abutment. Said load concentration over a small zone at the groove enables, according to that document, to localize a maximum amount of load at that level without plastifying the abutment.

However, the sealing performance of such prior art connections which are successively subjected to internal and external pressure loads has not been considered.

In particular the inventors have observed that connections such as those described in FR 2 359 353 have reduced leak-proofing performance when subjected in succession to the application of internal pressure then external pressure.

BRIEF SUMMARY OF THE INVENTION

The present invention seeks to increase the interference contact pressure between the metal-metal sealing surfaces of the male and female elements of a connection subjected to successive internal pressure and external pressure loads by overcoming the disadvantages cited above.

It also seeks to obtain a connection which performs well under all of the various load modes.

Further, the invention in particular seeks to be applicable to connections comprising an external seal and in particular connections with a constant external diameter (flush connections) of the type described in FR 2 359 353 and joints with an almost constant external diameter (semi-flush) of the type described in EP 0 767 335.

In accordance with the invention, the connection comprises a male element disposed at the end of a first tubular component comprising a male threading and a female element disposed at the end of a second tubular component comprising a female threading corresponding to the male threading.

At least one of the male or female elements comprises a lip between the threading and the free end of the element and the other element comprises a recess for said lip.

Said lip comprises a first zone with a peripheral surface which is turned towards the other element. A first metallic sealing surface is located on said peripheral surface. Said first metallic sealing surface is capable of being radially interference fitted against a second metallic sealing surface which corresponds thereto on the other element.

Said lip has a second zone located axially between said first zone and the corresponding threading.

In accordance with a principal characteristic of the invention, the radial stiffness of said second zone is less than that of the first zone and that of a third zone adjacent to the second zone in the direction of the threading.

In accordance with the invention, said second zone is capable of being radially deformed by the pressure which is exerted thereon.

In accordance with another principal characteristic of the invention, said first metallic sealing surface is capable of being in interference point contact with said corresponding second metallic sealing surface in a longitudinal axial sectional view.

Advantageously, the second zone is adjacent to the threading.

In a preferred embodiment, the second zone has an axial length in the range 50% to 130% of the axial length of the first zone.

Advantageously again, said second zone is thinned with respect to the first zone defined by an annular groove located on a peripheral surface of said thinned zone.

Preferably, said annular groove comprises two inclined flanks and a bottom which has a cylindrical surface.

Preferably, the groove has an asymmetrical profile; the flank located on the first zone side is less inclined than that located on the threading side.

Advantageously, said cylindrical surface has an axial length in the range 5% to 75% of the axial length of the second zone.

In an advantageous embodiment, said thinned zone has a minimum thickness in the range 50% to 90% of the thickness of said first zone, measured at the contact point of the first and second metallic sealing surfaces.

Preferably, said flank of the groove located on the first zone side is a portion with a tapered surface.

Advantageously, said portion with a tapered surface makes an angle in the range 5° to 50° with the axis of the connection.

Advantageously again, one of the first and second metallic sealing surfaces is a portion with a toric surface while the other is a portion with a tapered surface.

Preferably, the radius of said portion with a toric surface is in the range 10 to 100 mm and more preferably in the range 20 to 80 mm.

Preferably, the taper of the other tapered metallic sealing surface is in the range 5% to 50%.

Advantageously, said toric surface portion is disposed on said lip.

Advantageously again, said lip is located on said female element.

In another embodiment of the invention, said lip is located on said male element.

In yet another embodiment of the invention, each of the two elements comprises a lip with a first and a second zone.

Other advantages and characteristics of the invention will become apparent from the detailed description below and the accompanying drawings, which may thus not only serve to provide a better understanding of the invention, but may also contribute to its definition, if appropriate.

BRIEF DESCRIPTION OF DRAWINGS

FIG. 4 is a detail of the female element of the connection of FIG. 3 at the female lip of the connection of the invention.

FIG. 5 shows a detail of the male element of the connection of FIG. 3 at the recess of the male element of the connection of the invention.

FIG. 8 shows a longitudinal section of a made up connection in another embodiment of the invention.

DETAILED DESCRIPTION OF THE INVENTION

Figure 1A:
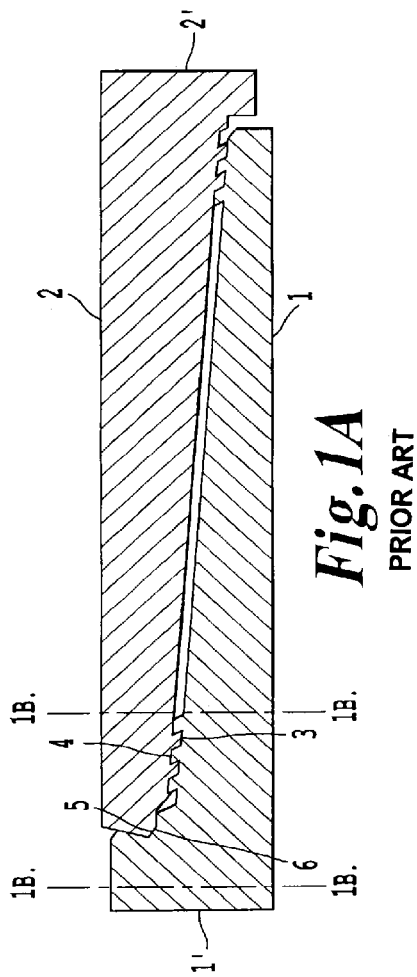
FIG. 1*a* shows a longitudinal section of a prior art connection in the made up state.

FIG. 1*a* shows the connection described in FR 2 359 353, which comprises a male element 1 disposed at the end of a first tubular component 1' comprising a male threading 3, and a female element 2 disposed at the end of a second tubular component 2', comprising a female threading 4 corresponding to the male threading 3. The first tubular component 1' is, for example, a relatively great length tube, the second is in this case another tube, also a great length tube, but it may be a coupling. The female element 2 comprises a lip 5 located between the female threading 4 and the free end of the female element. The male element 1 comprises a male recess 6 for said lip 5 located between the male threading 3 and the base of the male element.

Figure 1B:
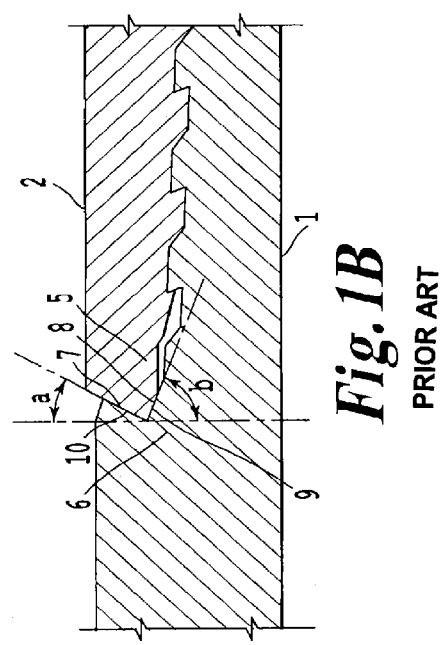
FIG. 1*b* is a detail of FIG. 1*a* at the free end of the female element.

FIG. 1*b* shows a detail of FIG. 1*a*, showing the free end of the female element and the corresponding male recess 6.

An outer inverse tapered annular abutment surface 7 is disposed on the front surface of the free end of the female element and is adjacent to a first tapered metallic sealing surface 8 disposed on the peripheral surface of the lip 5 turned towards the male element 1. Said first metallic sealing surface 8, making an angle b of the order of 60° with the plane perpendicular to the axis of the connection and with a very short axial length, is applied with a given radial interference fit against a corresponding second tapered metallic sealing surface 9 disposed on the peripheral surface of the male recess 6 at the base thereof to form an outer metal-metal seal.

The male recess 6 is connected to the outer peripheral surface of the first tubular component 1' via an outer inverse tapered annular abutment surface 10 capable of cooperating with the corresponding outer abutment surface of the female element 7. The angle a of the inverse abutment is 15°, for example.

The outer abutment allows the first and second sealing surfaces to be axially positioned with respect to each other and thereby defines their radial interference fit.

The performances of said connection under various axial loads are determined with respect to those of the tubular component.

Figure 2:
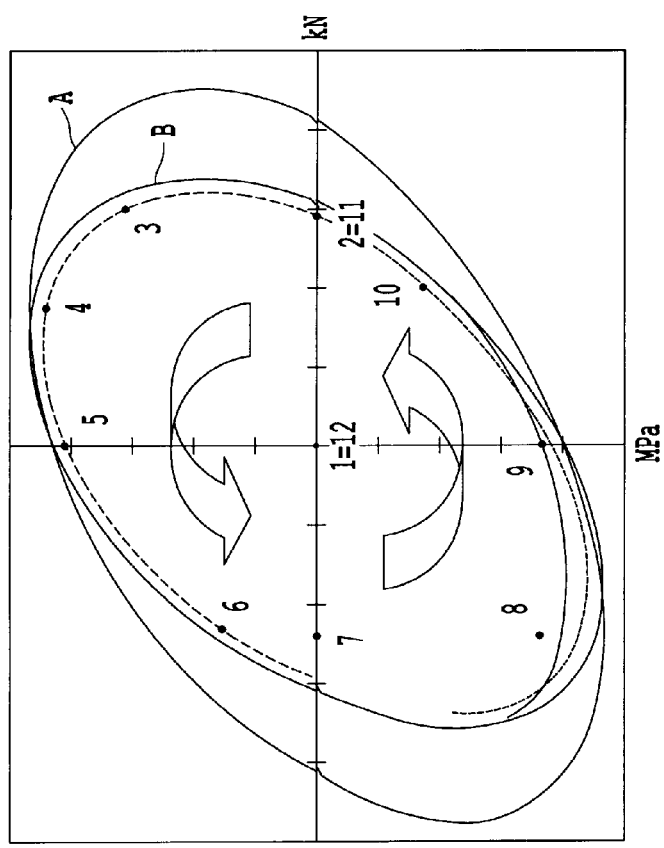
FIG. 2 shows a Von Mises ellipse wherein the axes represent the various loads to which the tubular components and connections of those components may be subjected during use thereof.

FIG. 2 shows a diagram defined by two axes respectively corresponding in the positive and negative abscissae to tension and compression loads (kN) and respectively corresponding in the positive and negative ordinate to internal and external pressure loads (MPa). Said loads are those to which the tubular components and the connections are subjected during their use in the well.

Plasticity theory teaches that the limit of resistance to plastification of a tubular component subjected to various combined loads is an ellipse (known as the Von Mises ellipse). Said ellipse is defined by the dimensions and the yield strength of the tubular component which is subjected to various combinations of the loads cited above.

In order to perform, the connection subjected to the same loads as the tubular component must have a resistance which is as close as possible to that of the tubular component. The surface of the ellipse for the connection must thus cover a surface of the ellipse of the tubular component which is as large as possible so that the connection does not plastify before the tubular component.

In the case of the connection of FIG. 1, the presence of an outer abutment reduces the tensile strength of the connection compared with that of a tubular component thus producing an ellipse with a relatively smaller surface area for the connection.

The connection of the invention is intended to be leakproof in service, and so its seal must be checked for various combinations of the loads to which it may be subjected during use in the well.

The various combinations of the loads for which the connection is guaranteed then correspond to points located inside the ellipse of the tubular component A forming the ellipse of the connection B, as shown in FIG. 2.

To define the performance of the seal of the connection, qualification tests are carried out by applying, in the form of a cycle, different combinations of loads located inside the ellipse relating to the tubular component. In particular, it is important to verify that after and during an internal/external pressure cycle, the seal of the connection remains intact.

Such tests are defined, for example, in International standard ISO 13679 (test procedures for connections for casing and tubing strings).

Application of internal pressure to the connection of FIG. 1 produces swelling of the first 1' and second 2' tubular component which causes deformation of the first and second metallic sealing surfaces 8, 9.

At said metallic sealing surfaces, the female element has a smaller section than the section of the male element, and thus the deformation of the outer metallic sealing surface of the female element is greater than that of the outer metallic sealing surface of the male element.

Thus, when the internal pressure reduces, the male and female elements may not return to their exact initial relative positions. The initial radial interference enabling the seal of the connection may thus be partially reduced and, because of the high value of the angle b and the very short length of the tapered shape of the first metallic sealing surface 8, the contact pressure may be greatly reduced.

In contrast, when an external pressure is applied following application of internal pressure, the metallic sealing surfaces where the contact pressure has been diminished no longer ensure a sufficient seal of the threaded tubular connection which then risks leaking at the outer sealing surface.

Figure 3:
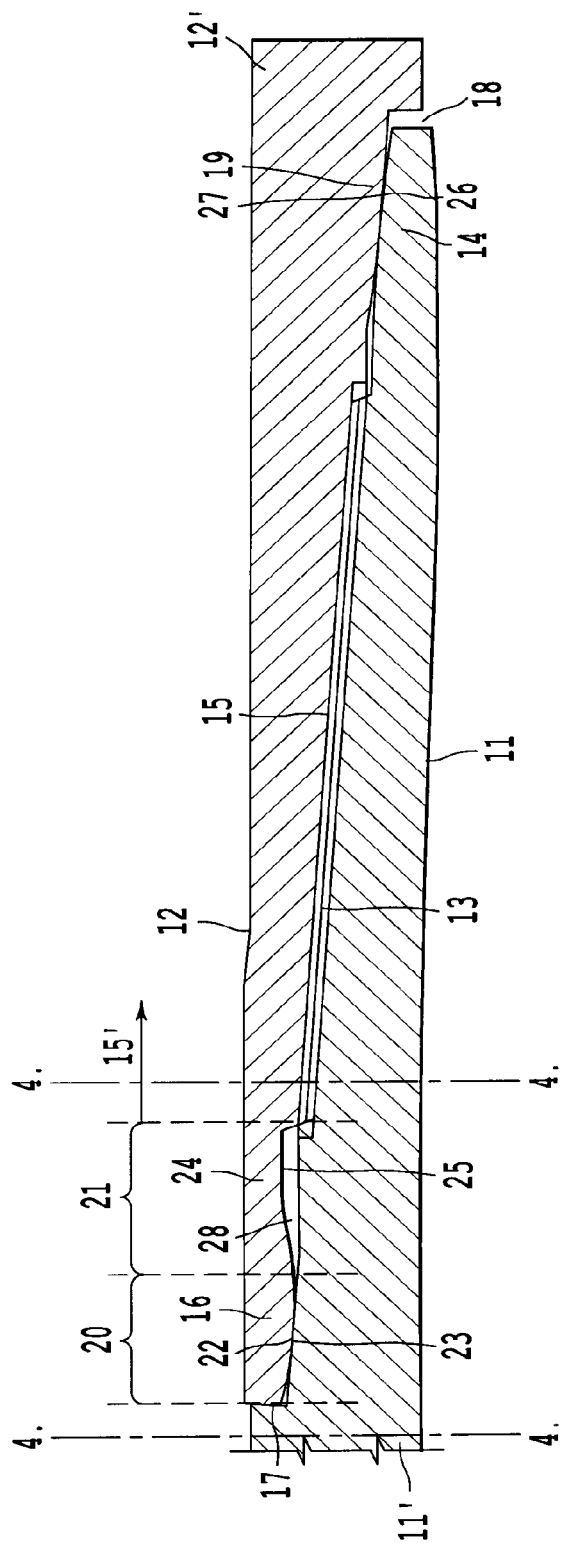
FIG. 3 shows a longitudinal section of a made up connection in accordance with an embodiment of the invention.

FIG. 3 shows a threaded tubular connection in accordance with a preferred embodiment of the invention which comprises a male element 11 disposed at the end of a first tubular component 11' comprising a male threading 13 and a female element 12 disposed at the end of a second tubular component 12' comprising a female threading 15 corresponding to the male threading 13.

The female element 12 comprises i) a female lip 16 located between the female threading 15 and the free end of the female element 17 and ii) a female recess 19 opposed to the female lip 16.

The female lip 16 comprises a first zone 20 having a peripheral surface turned towards the male element 11 on which a first metallic sealing surface 22 is located, and a second zone 21 located axially between the first metallic sealing surface 22 and the female threading 15.

Said first sealing surface 22 is capable of coming into tight interference point contact with a second metallic sealing surface 23 located at the base of the male element 11.

The second zone 21 adjacent to the threading 15 is defined by a zone 24 which is thinned with respect to the first zone 20 and comprises an inner peripheral surface on which a groove 25 is produced. Because of the reduced thickness resulting from groove 25, said second zone 21 has a radial stiffness which is less than the first zone 20 and the wall of the female element beyond the second zone 21, i.e. in the present case, the wall of the threading zone 15'.

By radial stiffness of the wall of the threading zone 15 we mean the radial stiffness of the wall leaving the threading out of consideration, i.e. in the present case of the wall which is limited on one side by the external diameter of the female element and on the other side by the envelope of the root of the threads.

The notion of "stiffness" includes the inherent characteristics of the material and its dimensional characteristics.

Since the thinned zone 24 is disposed between two zones with a higher radial stiffness, it is designed to deform radially when an external pressure is applied and thus to generate an excess of elastic interference contact energy between the first and second metallic sealing surfaces 22, 23.

The male element comprises i) a male lip 14 located between the male threading 13 and the free end of the male element 18 comprising a third metallic sealing surface 26 capable of coming into interference point contact with a fourth metallic sealing surface 27 at the recess 19 of the female element 12, and ii) opposed to the male lip 14, a male recess 28 defined by a non threaded outer peripheral surface located between the male threading 13 and the base of the male element 11, comprising the second metallic sealing surface 23 capable of coming into interference point contact with the first metallic sealing surface 22 of the female element 12. The interference point contact between the first metallic sealing surface 22 and the second metallic sealing surface 23, for example, will be defined by a combination of each single point interference contact (P), formed by each point ($P_1$) of a first annular contact line on the first metallic sealing surface 22 and each corresponding point ($P_2$) of a second annular contact line on the second metallic sealing surface 23.

FIG. 4 shows a preferred embodiment of the first and second zones 20, 21 of the female lip 16 of the invention.

Radial deformation of the second zone 21 induces a rotation of the longitudinal section of the first zone 20 on which the first metallic sealing surface 22 is located. To improve contact maintenance with the second metallic sealing surface 23 during application of the external pressure, the first zone 20 comprises a portion with a convex toric surface 29 with a large radius which may be in the range 10 mm to 100 mm, preferably in the range 20 mm to 80 mm, for example of the order of 40 mm.

Said portion with a toric surface 29 which constitutes the effective contact zone is connected to the front face of the free end of the female element 17 via a tapered surface 30 inclined at about 10° to the axis and to the groove 25 by a cylindrical surface 31. The tapered 30 and cylindrical 31 surfaces are tangentially connected to the toric surface 29 and together with the toric surface 29 form the first zone 20.

The length of the first zone 20 corresponds to the sum of the axial lengths of the tapered 30, toric 29 and cylindrical 31 surfaces.

The second zone 21 preferably has a length which is substantially equal to 100% of the length of the first zone 20, in order to allow it to bend. A length of less than 50% causes a smaller bending effect in the second zone 21 which produces less contact of the first and second metallic sealing surfaces 22, 23. A length of more than 130% produces major bending in the second zone, which may result in exaggerated rotation of the first zone 20 and risk losing contact between the metallic sealing surfaces 22, 23 (leak).

The thinned zone 24 comprises a cylindrical surface 32.

Said cylindrical surface 32 is more located on the female threading 15 side and is connected to the first zone 20 via a first tapered surface 33 with an inclination of the order of 10° with respect to the axis of the connection and to the threading 15 via a second tapered surface 34 which is relatively steep with an inclination of the order of 60° with respect to the axis of the connection. This means that the profile of the groove 25 is not symmetrical. The inclination is selected so as to optimize the load distribution in the thinned zone 24.

The cylindrical surface 32 defines a minimum thickness zone the length of which is in this case equal to 50% of the length of the second zone 21 and the thickness of which is in this case equal to 70% of the thickness of the first zone 20.

The thickness of the first zone 20 is taken at the first metallic sealing surface 22 at the level of the contact point P.

A length of the cylindrical surface 32 of less than 5% or more than 75% of the length of the second zone 21 would tend to degrade the load distribution.

A thickness of less than 50% of the thickness of the first zone 20 may reduce the stiffness of the second zone 21 too much and thus induce plastification. A thickness of more than 90% of the thickness of the first zone 20 may make the second zone 21 too stiff, which does not allow deformation of the second zone 21, and thus the surplus interference contact energy between the metallic sealing surfaces 22, 23 is not generated.

FIG. 5 shows a preferred form of the recess of the male element 28 of the connection of the invention capable of coming into interference contact with the first metallic sealing surface 22 of the first zone 20.

Starting from the base of the male element 11, the recess of the male element 28 comprises a tapered surface 35, the inclination of which is of the order of 3° with respect to the axis of the connection, a portion with a large radius concave toric surface 36, and a cylindrical surface 37. The angle of inclination of the tapered surface also may be expressed in terms of a percentage (%) according to the equation for a slope of a surface:

slope=100·tan(angle of inclination).

The toric surface portion 36 produces the tangential connection of the tapered surface 35 and the cylindrical surface 37.

The principal characteristic of the invention is that the radial interference which may be partially lost following application of the internal pressure in the connection of FIG. 1 is retained in the present invention by radial deformation of the second zone 21 under the effect of the external pressure which is exerted thereon.

Figure 6:
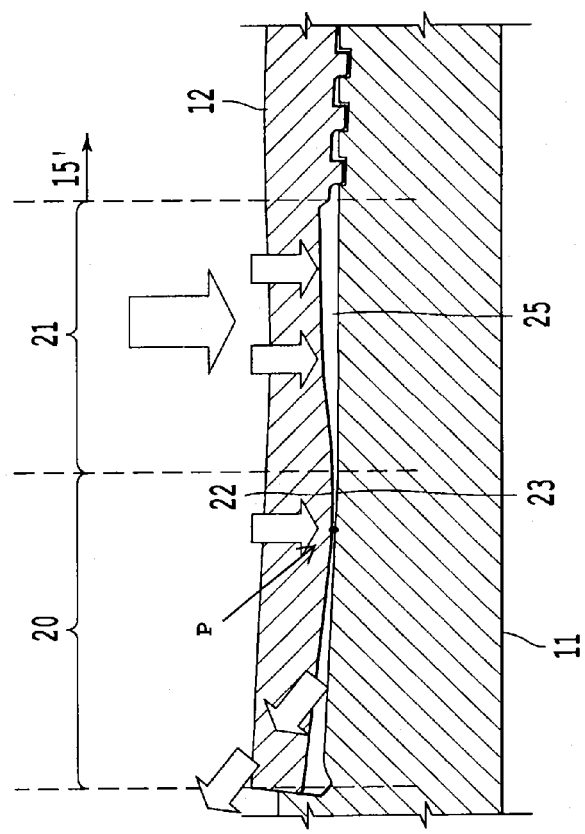
FIG. 6 shows a connection of the invention subjected to an external pressure.

FIG. 6 shows a connection in accordance with an embodiment of the invention which is subjected to external pressure. Radial deformation of the second zone 21 induces rotation of the first zone 20 and generates an interference contact energy between the first and second metallic sealing surfaces 22, 23 which maintains sufficient contact pressure to ensure sealing characteristics at the contact zone between the first and second metallic sealing surfaces 22, 23.

The toric surface 29/tapered surface 35 combination of the first and second metallic sealing surfaces 22, 23 conserves the radial interference between the surfaces, despite rotation of the first zone 20 induced by radial deformation of the second zone 21.

Figure 7:
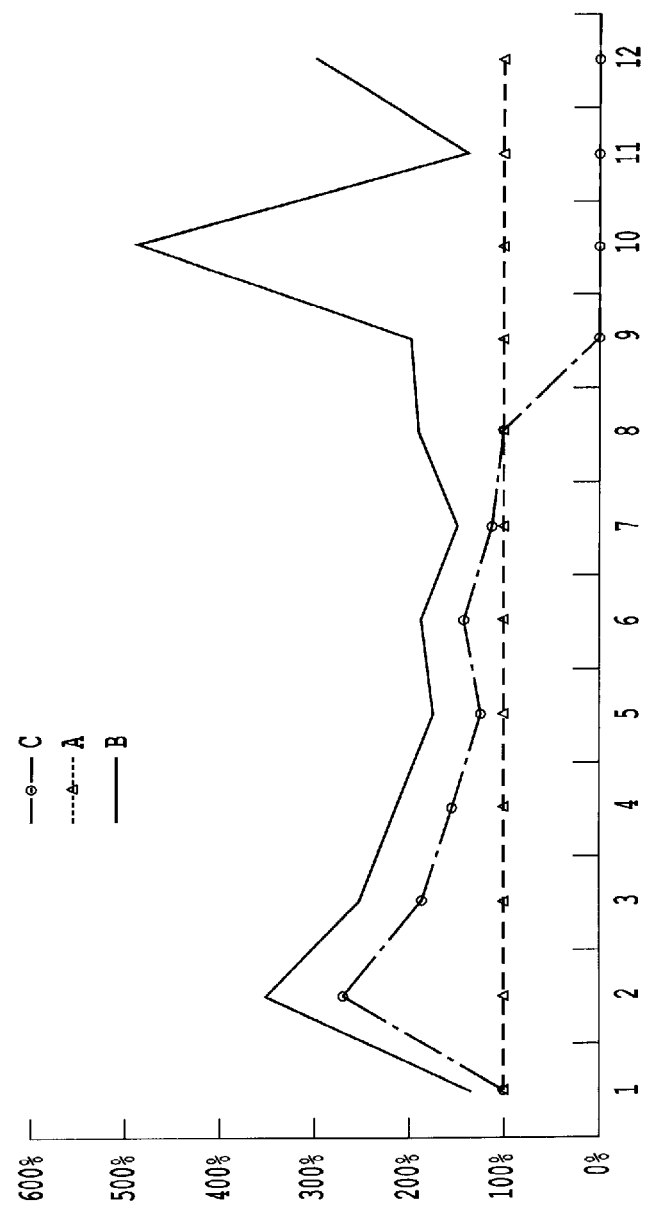
FIG. 7 is a graph showing relative measurements of contact pressure obtained by analyzing finished elements on various types of connections subjected to various successive modes of loads in accordance with the points of FIG. 2.

The graph of FIG. 7 compares the contact area, hereinafter termed the contact pressure integral, between the first and second metallic sealing surfaces of several connections subjected to a cycle of loads passing through the ellipse tubular component. The abscissa axis represents the various loads applied and the ordinate axis represents the integral of the contact pressure obtained along the contact of the first and second metallic sealing surfaces (contact area). Measurement of this contact pressure integral is obtained by analysis of the finished elements. The values obtained are relative values expressed as a percentage and normalized with respect to the first and second reference metallic sealing surfaces, namely those of the prior art connection of FIG. 1.

The contact pressure integrals of the following connections were thus simulated:

Example A: prior art connection of FIG. 1, acting as the reference;

Example B: connection of the embodiment of the invention of FIG. 3;

Example C: connection with toric/tapered metallic sealing surfaces of the embodiment of the invention of FIG. 3 but without a thinned zone.

Example C is a comparative example which is outside the scope of the invention.

The various loads which correspond to the points located inside the ellipse are marked in FIG. 2. Table 1 below shows the key.

With respect to the reference connection (example A), it can be observed that the sealing performance of the connection of FIG. 3 (Example B) is much better regardless of the type of load during the cycle. This performance is also better than that of the connection of Example 3 produced without a groove.

It will be observed that when there is no groove, the sealing characteristics of the connection drop just after application of the tension and the sealing characteristics are reduced with respect to the reference as soon as external pressure is applied (numeral 8 and the following), even though the absolute performance of the reference is not optimal.

TABLE 1

| Key to loads applied and position on connection ellipse | |
| --- | --- |
| Reference on ellipse | Applied load(s) |
| 1 | None |
| 2 | Tension |
| 3 | Tension + internal pressure |
| 4 | Capped end pressure |
| 5 | Internal pressure |
| 6 | Compression + internal pressure |
| 7 | Compression |
| 8 | Compression + external pressure |
| 9 | External pressure |
| 10 | Tension + external pressure |
| 11 | Tension |
| 12 | None |

The advantageous effect of the groove 25 provided on the connection of FIG. 3 of the invention is thus demonstrated.

One advantage of the present invention is to obtain at the female lip 16 a zone which is deformable under the effect of external pressure wherein the energy obtained by the deformation is used to generate supplemental contact pressure at the first metallic sealing surface 22.

Another advantage of the embodiment of the present invention shown in FIG. 3 is that the initial clearance between the groove 25 and the male recess 28 allows a relatively large deformation of the second zone 21.

Another advantage of the present invention is that it is applied regardless of the yield strength of the tubular component.

The present invention is not limited to the embodiments which have been described above as non limiting examples. It also concerns all other variations made within the skills of the skilled person in the context of the claims below.

In the non-limiting embodiment discussed above, the second zone is provided on the lip of the female element with a groove located on the side turned towards the male element.

Alternatively the second zone could be located on the lip of the female element with the groove turned to the side opposite the male element.

However, this embodiment to a lesser degree allows the thinned zone to deform radially towards the male element.

In a further embodiment, the second zone could be located on the lip of the male element and the groove located on the side turned towards the female element in association with the inner metallic sealing surfaces.

Alternatively the two elements 11, 12 comprise a lip 14, 16, a first zone 20, 38 and a second zone 21, 39 with a groove 25, 40 located on the side turned towards each of the corresponding elements, as illustrated in FIG. 8.

Alternatively the second zone could not be defined by a groove, but produced with a material with a different modulus of elasticity, or a material that undergoes a heat treatment, to reduce stiffness and enable deformation.

The second zone does not have to be adjacent to the threading as long as the adjacent zone in the direction of the threading has a radial stiffness which is greater than that of the second zone.

It is also possible to envisage forms of the first and second sealing surfaces so that they are in linear contact rather than point contact, for example by giving these surfaces a tapered form with the same taper, although this embodiment would not be optimal.

The embodiment shown in FIG. 3 corresponds to a connection with an almost constant external diameter, termed a flush connection and an external abutment.

The invention does not involve the abutment in the function of the connection subjected to an internal pressure then to an external pressure, nor variations in the diameter between the male and female elements.

The invention thus aims to be applied to types of connections other than flush type connections, such as semi-flush connections (for which the external diameter of the female element is only slightly greater than that of the male element), connections with an internal abutment, an intermediate abutment between portions of a threading or between two stages of the threading, or without an abutment (for example, connections with progressive axial interference threadings of the type described in documents U.S. Re30,647, U.S. Re34,467 or WO02004/106797).

What is claimed:

1. A leak-proof threaded tubular connection comprising:
 a male element disposed at an end of a first tubular component comprising a male threading;
 a female element disposed at an end of a second tubular component comprising a female threading corresponding to the male threading;
 at least one of the male or female elements comprising a lip between a respective threading and a respective free end of the one of the male or female element and the other of the male or female element comprising a recess for the lip, the lip comprising a first zone with a peripheral surface turned towards the other of the male or female element on which a first metallic sealing surface is disposed that is radially interference fitted against a corresponding second metallic sealing surface disposed on the other of the male or female element, the lip comprising a second zone located axially between the first zone and the respective threading along an axis of the tubular connection, and wherein radial stiffness of the second zone is less than that of the first zone and that of a third zone adjacent to the second zone in a direction towards the respective threading, the second zone being radially deformed by a pressure exerted thereon, the second zone includes a peripheral surface that defines an annular groove including a first tapered surface connected to a first cylindrical surface at an end of the first zone, a second cylindrical surface connected to the first tapered surface, and a second tapered surface connected to an end of the second cylindrical surface opposite to an end connected to the first tapered surface, and an angle of inclination of the first tapered surface is less than an angle of inclination of the second tapered surface, the first metallic sealing surface is in one interference point contact with the corresponding second metallic sealing surface, and the one interference point contact is defined by a combination of each single point interference contact formed by each point of a first annular contact line on the first metallic sealing surface and each corresponding point of a second annular contact line on the second metallic sealing surface, and the second cylindrical surface having a minimum thickness a the range of 50% to 90% of a thickness of a portion of the first metallic sealing surface of the first zone in the one interference point contact with the corresponding second metallic sealing surface, and less than 90% of a thickness of a wall of the respective threading.

2. A threaded tubular connection according to claim 1, wherein the third zone is a threading zone and defines at least a portion of the respective threading of the one of the male or female element comprising the lip.

3. A threaded tubular connection according to claim 1, wherein the second zone has an axial length in a range of 50% to 130% of an axial length of the first zone.

4. A threaded tubular connection according to claim 1, wherein the second cylindrical surface has an axial length in a range of 5% to 75% of an axial length of the second zone.

5. A threaded tubular connection according to claim 1, wherein the angle of inclination of the first tapered surface is in a range of 5° to 50° with respect to the axis of the threaded tubular connection.

6. A threaded tubular connection according to claim 1, wherein one of the first and second metallic sealing surfaces includes a portion with a toric surface, and the other of the first and second metallic sealing surfaces includes a portion with a third cylindrical surface and a portion with a third tapered surface that is tapered along an axis that intersects a longitudinal axis of the third cylindrical surface.

7. A threaded tubular connection according to claim 6, wherein a radius of the portion with the toric surface is in a range of 10 to 100 mm.

8. A threaded tubular connection according to claim 6, wherein a radius of the portion with the toric surface is in a range of 20 to 80 mm.

9. A threaded tubular connection according to claim 6, wherein a slope of a taper of the portion with the third tapered surface is in a range of 5% to 50% according to the equation:

$$\text{slope} = 100 \cdot \tan(\text{angle of inclination}).$$

10. A threaded tubular connection according to claim 6, wherein the portion with the toric surface is disposed on the lip.

11. A threaded tubular connection according to claim 1, wherein the lip is located on the female element.

12. A threaded tubular connection according to claim 1, wherein the lip is located on the male element.

13. A threaded tubular connection according to claim 1, wherein each of the male element and the female element comprises a lip comprising a second zone with an annular groove on a side of a respective element turned towards a respective corresponding element.

14. A threaded tubular connection according to claim 1, wherein the first metallic sealing surface comprises a first tonic surface portion adjacent to the first cylindrical surface portion and the first annular contact line is provided on the first tonic surface portion, and
    the second metallic sealing surface comprises a toric surface portion adjacent to a tapered surface portion of the second metallic sealing surface and the second annular contact line is provided on the tapered surface portion of the second metallic sealing surface.

15. A threaded tubular connection according to claim 14, wherein
    the first metallic sealing surface includes a third tapered surface portion, and the first toric surface portion is disposed between the third tapered surface portion and the second cylindrical surface portion, and
    the second metallic sealing surface includes a cylindrical surface portion, and the tonic surface portion of the second metallic sealing surface is disposed between the tapered surface portion and the cylindrical surface portion of the second metallic sealing surface.

16. A threaded tubular connection according to claim 1, wherein the first zone includes the first cylindrical surface, a tonic surface, and a third tapered surface, and
    the tonic surface is adjacent to and extends between the first cylindrical surface and the third tapered surface, and the third tapered surface extends from the tonic surface to the respective free end of the one of the male element and the female element.

\* \* \* \* \*

UNITED STATES PATENT AND TRADEMARK OFFICE
CERTIFICATE OF CORRECTION

PATENT NO. : 8,641,100 B2  Page 1 of 1
APPLICATION NO. : 12/529933
DATED : February 4, 2014
INVENTOR(S) : Patureau et al.

It is certified that error appears in the above-identified patent and that said Letters Patent is hereby corrected as shown below:

In the Specification

Column 9, line 46, change "WO02004/106797" to --WO/2004/106797--.

In the Claims

Claim 1, Column 10, line 25, change "a the" to --in a--.

Claim 14, Column 11, line 10, change "tonic" to --toric--;
Claim 14, Column 11, line 12, change "tonic" to --toric--.

Claim 15, Column 12, line 6, change "tonic" to --toric--;
Claim 16, Column 12, line 12, change "tonic" to --toric--;
Claim 16, Column 12, line 13, change "tonic" to --toric--;
Claim 16, Column 12, line 15, change "tonic" to --toric--.

Signed and Sealed this
Sixteenth Day of September, 2014

Michelle K. Lee
*Deputy Director of the United States Patent and Trademark Office*